(12) United States Patent
Ishikawa et al.

(10) Patent No.: US 12,394,315 B2
(45) Date of Patent: Aug. 19, 2025

(54) INFORMATION COLLECTION SYSTEM

(71) Applicant: TOYOTA JIDOSHA KABUSHIKI KAISHA, Toyota (JP)

(72) Inventors: Marie Ishikawa, Nagoya (JP); Aya Hamajima, Nagoya (JP); Daichi Hotta, Tokyo (JP); Hayato Ito, Susono (JP); Hidekazu Sasaki, Yokohama (JP); Yasuhiro Kobatake, Nagoya (JP); Akihiro Kusumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 17/963,567

(22) Filed: Oct. 11, 2022

(65) Prior Publication Data
US 2023/0125597 A1    Apr. 27, 2023

(30) Foreign Application Priority Data
Oct. 27, 2021    (JP) .................................. 2021-175893

(51) Int. Cl.
G08G 1/00    (2006.01)
G05D 1/00    (2024.01)
G06V 20/56    (2022.01)

(52) U.S. Cl.
CPC ........... G08G 1/202 (2013.01); G05D 1/0217 (2013.01); G05D 1/0246 (2013.01);
(Continued)

(58) Field of Classification Search
CPC .. G08G 1/202; G08G 1/205; G08G 1/096816; G08G 1/0112; G05D 1/0217;
(Continued)

(56) References Cited

U.S. PATENT DOCUMENTS 11,417,109 B1 *   8/2022   Theimer .................. G06N 3/08
11,823,564 B1 *   11/2023  Wittevrongel ....... G08G 1/0112
(Continued)

FOREIGN PATENT DOCUMENTS

JP    2016-025659 A    2/2016
JP    2019-114110 A    7/2019
(Continued)

OTHER PUBLICATIONS

Machine translation WO-2020031924-A1 (year:2020).*

*Primary Examiner* — Anne Marie Antonucci
*Assistant Examiner* — Jodi Jones
(74) *Attorney, Agent, or Firm* — Dinsmore & Shohl LLP

(57) ABSTRACT

An information collection system includes a plurality of vehicles and a server. The server is configured to, when an event occurrence notification notifying that a specific event has occurred at least together with an event occurrence location is received, select at least one vehicle to move toward the event occurrence location from among the vehicles as an information collection vehicle, and transmit an information collection instruction notification to the information collection vehicle. The vehicles are configured to, when the information collection instruction notification is received, move toward the event occurrence location and collect images captured by a camera while the vehicles are moving as event-related information that is information related to the event.

9 Claims, 4 Drawing Sheets

(52) U.S. Cl.
CPC ........... *G05D 1/0287* (2013.01); *G06V 20/56*
(2022.01); *G08G 1/205* (2013.01)

(58) Field of Classification Search
CPC .. G05D 1/0246; G05D 1/0287; G05D 1/0094;
G05D 1/0297; G06V 20/56
USPC ....... 701/23, 117, 28, 25, 701, 26, 532, 408,
701/468, 450, 32.4, 29.3, 409, 36, 533, 2
See application file for complete search history.

(56) References Cited

U.S. PATENT DOCUMENTS

| | | | |
|---|---|---|---|
| 2013/0285803 A1* | 10/2013 | Kang | G07C 5/0866 340/436 |
| 2016/0019788 A1 | 1/2016 | Milne et al. | |
| 2019/0138023 A1* | 5/2019 | Niwa | B60W 30/165 |
| 2019/0196514 A1 | 6/2019 | Kanehara et al. | |
| 2019/0266815 A1* | 8/2019 | Andrade | B60W 30/182 |
| 2019/0339709 A1* | 11/2019 | Tay | G06F 16/23 |
| 2020/0117928 A1 | 4/2020 | Nishimura | |

FOREIGN PATENT DOCUMENTS

| | | | | |
|---|---|---|---|---|
| JP | 2020-061079 A | 4/2020 | | |
| WO | WO-2020031924 A1 * | 2/2020 | ............. | G08B 21/10 |

\* cited by examiner

INFORMATION COLLECTION SYSTEM

CROSS-REFERENCE TO RELATED APPLICATION

This application claims priority to Japanese Patent Application No. 2021-175893 filed on Oct. 27, 2021, incorporated herein by reference in its entirety.

BACKGROUND

1. Technical Field

The present disclosure relates to an information collection system.

2. Description of Related Art

Japanese Unexamined Patent Application Publication No. 2020-61079 (JP 2020-61079 A) discloses a traffic violation vehicle identification system including a vehicle configured to, when a traffic violation vehicle is detected based on an image of an in-vehicle camera, transmit an evidence image of the traffic violation and characteristic information (color, vehicle type, etc.) of the traffic violation vehicle to a server, and the server configured to identify the traffic violation vehicle based on the characteristic information of the traffic violation vehicle received from the vehicle and transmit the identification information (such as the number) of the identified traffic violation vehicle and the evidence image of the traffic violation to a client (such as the police).

SUMMARY

However, to detect a traffic violation using the traffic violation vehicle identification system of the related art described above, a vehicle capable of detecting a traffic violation needs to be incidentally present at the location where a traffic violation occurs at the moment when the traffic violation occurs. When an incident (specific event) occurs in the city, subsequent collection of information on a person, a vehicle, or the like that seems to have been at or around the scene of the incident as information related to the incident may contribute to identification of a criminal or a witness, for example, and therefore is important to resolve the incident.

The present disclosure has been made focusing on such an issue, and an object of the present disclosure is to collect, when a specific event such as an incident occurs in the city, information related to the event afterward.

In order to solve the above issue, an information collection system according to an aspect of the present disclosure includes: a plurality of autonomously traveling vehicles, each including a camera that captures an image of an outside of the vehicle; and a server configured to be communicable with each of the vehicles. The server is configured to select, when an event occurrence notification notifying that a specific event has occurred at least together with an occurrence location of the event is received, one vehicle for moving toward the occurrence location of the event from among the vehicles as an information collection vehicle, and transmit an information collection instruction notification to the information collection vehicle. The vehicles are each configured to, when the information collection instruction notification is received, move toward the occurrence location of the event and collect the image captured by the camera while the vehicles are moving as event-related information that is information related to the event.

Further, a server according to an aspect of the present disclosure includes: a communication unit that communicates with a plurality of autonomously traveling vehicles, each including a camera that captures an image of an outside of the vehicle; and a control unit. The control unit is configured to select, when an event occurrence notification notifying that a specific event has occurred at least together with an event occurrence location of the event is received, one vehicle for moving toward the occurrence location of the event while causing the camera to capture the image of the outside of the vehicle from among the vehicles as an information collection vehicle, and transmit an information collection instruction notification to the information collection vehicle.

Further, a vehicle according to an aspect of the present disclosure is an autonomously traveling vehicle including a camera that captures an image of an outside of the vehicle and a communication device that communicates with a server. The vehicle is configured to move toward an occurrence location of a specific event and collect the image captured by the camera while the vehicle is moving as event-related information that is information related to the event based on an instruction from the server.

According to these aspects of the present disclosure, when a specific event such as an incident occurs in the city, information related to the event can be collected afterward by a vehicle equipped with a camera.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described below with reference to the drawings. In the following description, similar components are given the same reference numbers.

Figure 1:
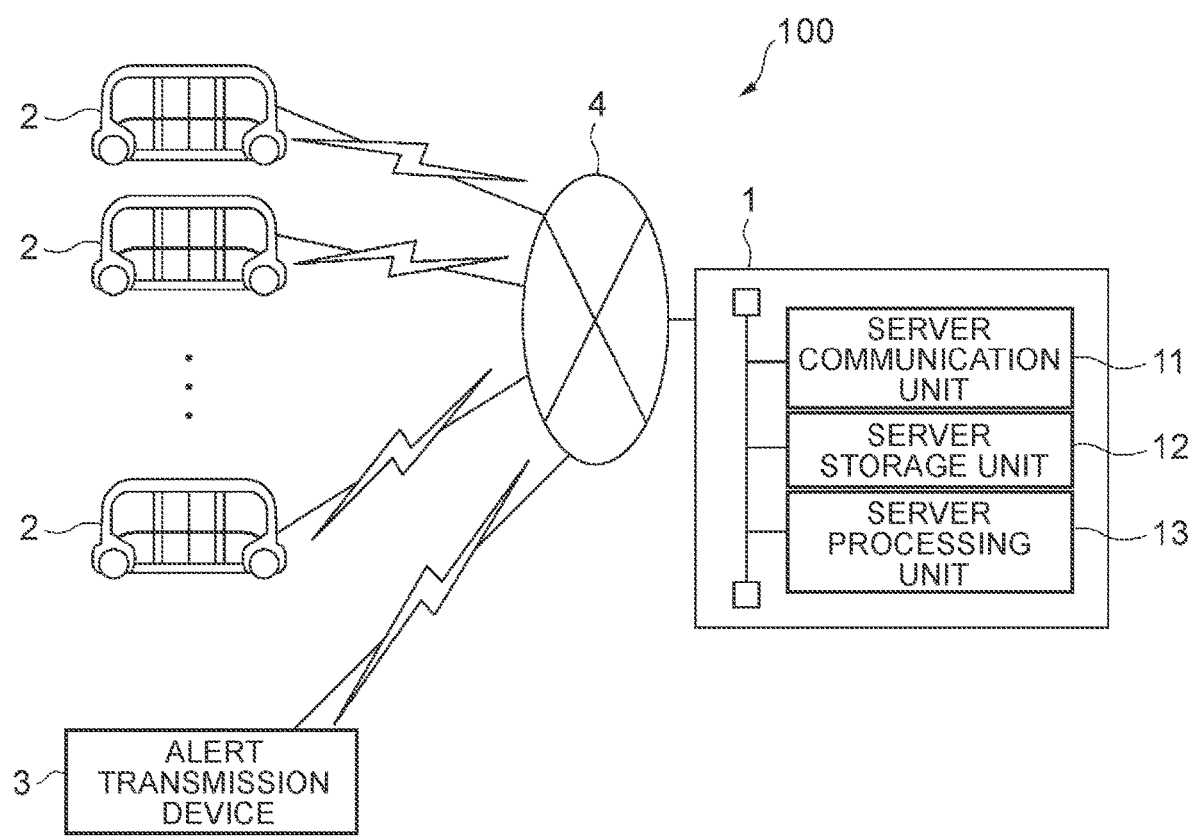
FIG. 1 is a diagram illustrating an outline of an information collection system according to an embodiment of the present disclosure.

FIG. 1 is a schematic configuration diagram of an information collection system 100 according to the embodiment of the present disclosure.

The information collection system 100 according to the present embodiment includes a server 1, a plurality of vehicles 2, and an alert transmission device 3.

The alert transmission device 3 has a wireless communication function, and is configured to be able to transmit a notification (hereinafter referred to as "event occurrence notification") notifying that a specific event has occurred to the server 1. In the present embodiment, the alert transmission device 3 is configured to be able to access a radio base station (not shown) connected to a network 4 via a gateway or the like. With this configuration, the alert transmission device 3 is connected to the network 4 via the radio base station and can communicate with the server 1 via the network 4.

Specific events are, for example, various incidents such as unauthorized intrusion into a house or building, theft, injury, fire, traffic accident, etc., and the event occurrence notification includes, for example, information related to the contents of the event that has occurred, the time when the event has occurred, and the location where the event has occurred.

The alert transmission device 3 may be configured to automatically detect occurrence of the specific event and transmit the event occurrence notification to the server 1, or may be configured to transmit the event occurrence notification to the server 1 in response to an operation to transmit the event occurrence notification performed by a person. An example of the alert transmission device 3 as in the former case is, for example, a security device installed in a house or a building to detect unauthorized intrusion or fire. As an example of the alert transmission device 3 as in the latter case includes, for example, a security buzzer (that may be a built-in buzzer or a portable buzzer) that transmits the event occurrence notification when a button is pressed, and a mobile terminal on which a transmission application to transmit the event occurrence notification is installed.

Each vehicle 2 is an autonomous vehicle capable of autonomous traveling, and is a vehicle used to provide various mobility services such as transportation, physical distribution, and product sales. In the present embodiment, the information collection system 100 is configured using, among the vehicles for such mobility services, the vehicle (autonomous bus) that travels on a predetermined traveling route at a predetermined time and provides a transportation service in which the vehicle stops at a predetermined location on the traveling route or a designated location by a person who desires to board and allows the person who desires to board to board the vehicle when a boarding request is made by the person who desires to board via an application, etc.

Figure 2:
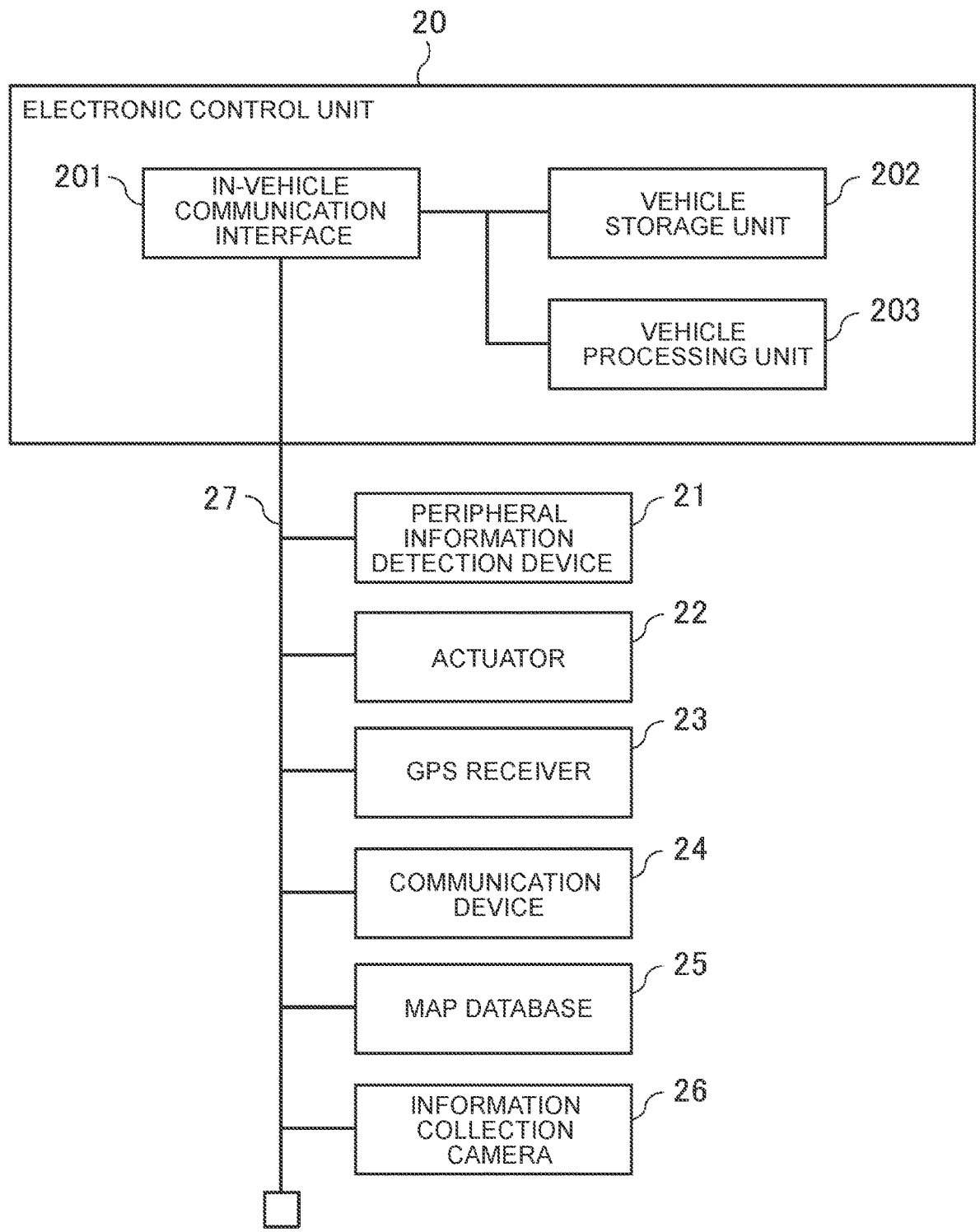
FIG. 2 is a diagram showing a hardware configuration of a vehicle.

FIG. 2 is a diagram showing a hardware configuration of the vehicle 2.

As shown in FIG. 2, the vehicle 2 includes a peripheral information detection device 21, an actuator 22, a global positioning system (GPS) receiver 23, a communication device 24, a map database 25, an information collection camera 26, and an electronic control unit 20, and is configured to be capable of automated driving operations related to acceleration, steering, and braking. The peripheral information detection device 21, the actuator 22, the GPS receiver 23, the communication device 24, the map database 25, and the information collection camera 26 are communicably connected to the electronic control unit 20 via an in-vehicle network 27 compliant with standards such as the controller area network (CAN).

The peripheral information detection device 21 detects the peripheral information of the vehicle 2. The peripheral information includes various types of information necessary for autonomous driving, such as white lines on roads, other vehicles, pedestrians, bicycles, buildings, signs, traffic lights, and obstacles. Examples of the peripheral information detection device 21 include a camera, a millimeter wave radar, a light detection and ranging (LiDAR), and an ultrasonic sensor. The peripheral information detection device 21 may be configured by any one of these, or may be configured by a combination thereof. The output from the peripheral information detection device 21 is transmitted to the electronic control unit 20.

The actuator 22 is various control components driven by the electronic control unit 20 for autonomous driving. Examples of the actuator include a drive device required for accelerating the vehicle 2 (for example, at least one of an internal combustion engine and a motor), a braking device required for braking the vehicle 2 (for example, a brake actuator), and a steering device required for steering the vehicle 2 (for example, a steering motor).

The GPS receiver 23 receives radio waves from artificial satellites, identifies the latitude and longitude of the vehicle 2, and detects the current position of the vehicle 2.

The communication device 24 is an on-board terminal having a wireless communication function. The communication device 24 is connected to the network 4 (see FIG. 1) via the radio base station by accessing the radio base station connected to the network 4 via a gateway or the like. With the above, it is possible to communicate with each other with the server 1.

The map database 25 stores map information. The electronic control unit 20 acquires map information from the map database 25.

The information collection camera 26 is, for example, an omnidirectional camera mounted on the roof of the vehicle 2. The information collection camera 26 periodically captures images of the road view along the traveling route while the vehicle 2 is traveling, and generates "event-related information" in which the captured road view images (images including people and vehicles on the road) are associated with the information on the location where the road view images are acquired and the time when the road view images are acquired (in other words, the information on the imaging location and the imaging time of the road view images).

In the present embodiment, when the event-related information generated as described above is temporarily stored in a vehicle storage unit 202 of the electronic control unit 20 and the capacity of the event-related information stored in the vehicle storage unit 202 becomes a predetermined amount or more, the event-related information is transmitted to the server 1 via the communication device 24. However, the present disclosure is not limited to this, and the generated event-related information may be transmitted directly to the server 1 via the communication device 24, or may be transmitted to an external client (for example, an administrative agency such as a police) in need of the event-related information.

The type, the number, and the mounting position of the information collection camera 26 are not particularly limited as long as the information collection camera 26 is configured to capture the road view along the traveling route. Further, when the peripheral information detection device 21 includes a camera, the camera may be substituted as a camera for collecting information, and a dedicated camera for collecting information is not always necessarily provided as in the present embodiment.

The electronic control unit 20 includes an in-vehicle communication interface 201, the vehicle storage unit 202, and a vehicle processing unit 203. The in-vehicle communication interface 201, the vehicle storage unit 202, and the vehicle processing unit 203 are connected to each other via signal lines.

A communication interface 41 is a communication interface circuit for connecting the electronic control unit 20 to the in-vehicle network 27.

The vehicle storage unit 202 includes a storage medium such as a hard disk drive (HDD), an optical recording medium, and a semiconductor memory, and stores various computer programs, data, and the like used for processing in the vehicle processing unit 203.

The vehicle processing unit 203 includes one or more central processing units (CPUs) and peripheral circuits thereof. The vehicle processing unit 203 executes various computer programs stored in the vehicle storage unit 202 to perform various processes, and is, for example, a processor.

Returning to FIG. 1, the server 1 includes a server communication unit 11, a server storage unit 12, and a server processing unit 13.

The server communication unit 11 includes a communication interface circuit for connecting the server 1 to the network 4 via, for example, a gateway, and is configured to be able to communicate with the alert transmission device 3 and the vehicle 2.

The server storage unit 12 includes a storage medium such as an HDD, an optical recording medium, and a semiconductor memory, and stores various computer programs, data, and the like used for processing in the server processing unit 13. For example, in the present embodiment, the server storage unit 12 stores the identification number and operation information (operation route and operation time) of each vehicle 2 (autonomous bus) that provides the mobile service. Further, the server storage unit 12 also stores, for example, map information as information necessary for setting an information collection route to be described later.

The server processing unit 13 includes one or more CPUs and peripheral circuits thereof. The server processing unit 13 executes various computer programs stored in the server storage unit 12 and comprehensively controls the overall operation of the server 1. The server processing unit 13 is, for example, a processor.

As described above, when a certain incident (specific event) occurs in the city, subsequent collection of information on a person, a vehicle, or the like that seems to have been at or around the scene of the incident as information related to the incident may contribute to identification of a criminal or a witness, for example, and therefore is important to resolve the incident.

Therefore, the server 1 according to the present embodiment is configured to direct an appropriate vehicle 2 selected from the vehicles 2 to an event occurrence location when the server 1 receives the event occurrence notification from the alert transmission device 3. Then, the vehicle 2 directed to an event occurrence location is caused to capture images of the road view along the route toward the event occurrence location, and the vehicle 2 is caused to collect information on the situation around the event immediately after the event occurs (hereinafter referred to as "event-related information"), such as information on the person or the vehicle that seems to have been at or around the event occurrence location.

Figure 3:
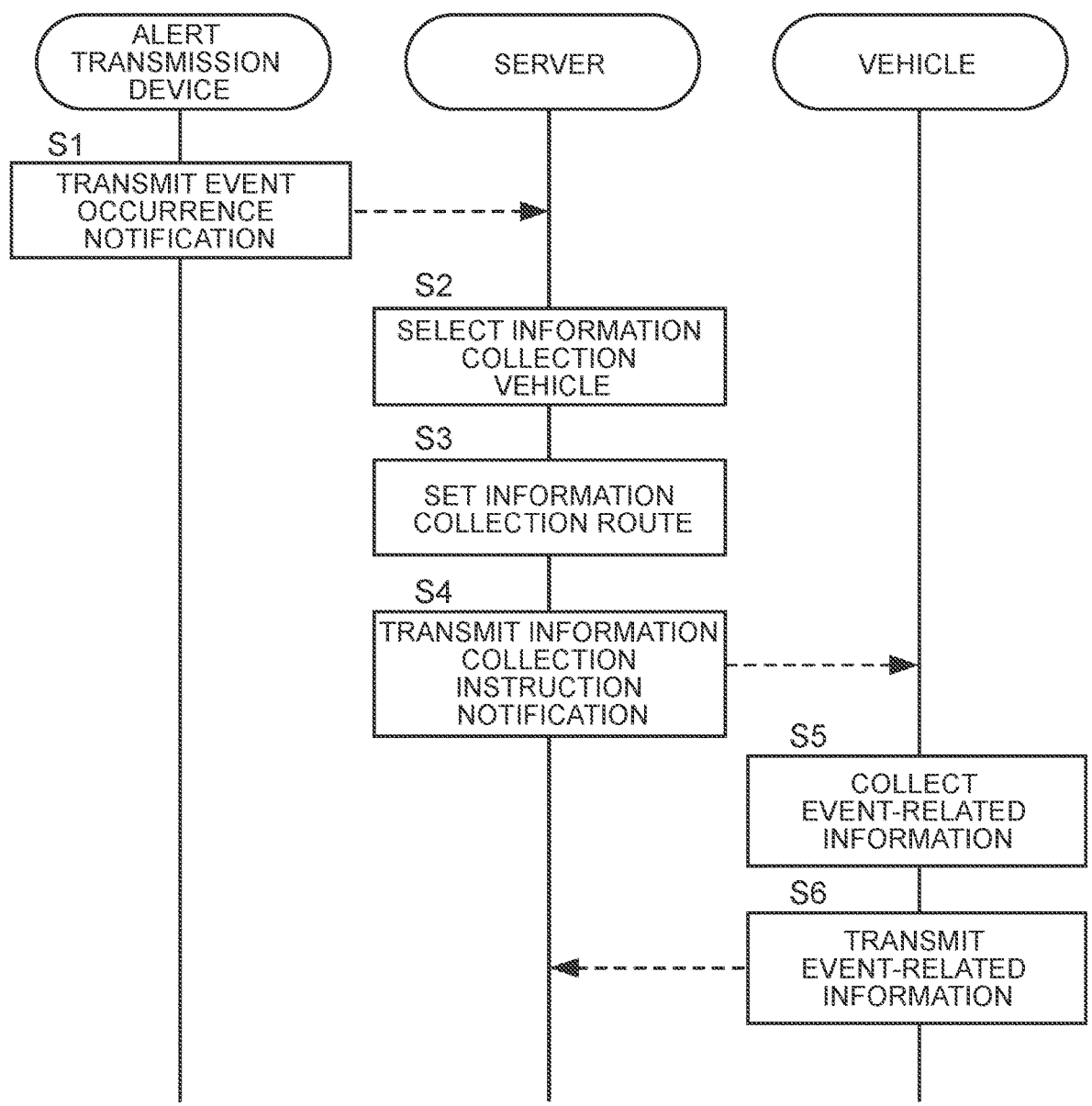
FIG. 3 is a sequence diagram showing an example of information collection processing according to the embodiment of the present disclosure for collecting event-related information.

FIG. 3 is a sequence diagram showing an example of information collection processing for collecting the event-related information. In the sequence diagram shown in FIG. 3, communication between the alert transmission device 3 and the server 1 and communication between the server 1 and the vehicle 2 are performed via the network 4, respectively.

In step S1, the alert transmission device 3 that automatically detects occurrence of an event, or the alert transmission device 3 that has been operated to transmit the event occurrence notification by a person transmits the event occurrence notification to the server 1. As described above, the event occurrence notification includes information related to the contents of the event that has occurred, the time when the event has occurred, and the location where the event has occurred.

In step S2, the server 1 that receives the event occurrence notification selects at least one vehicle (hereinafter referred to as an "information collection vehicle") that can be used for collecting the event-related information from among the vehicles 2 (autonomous buses) that provide the mobile service.

Figure 4:
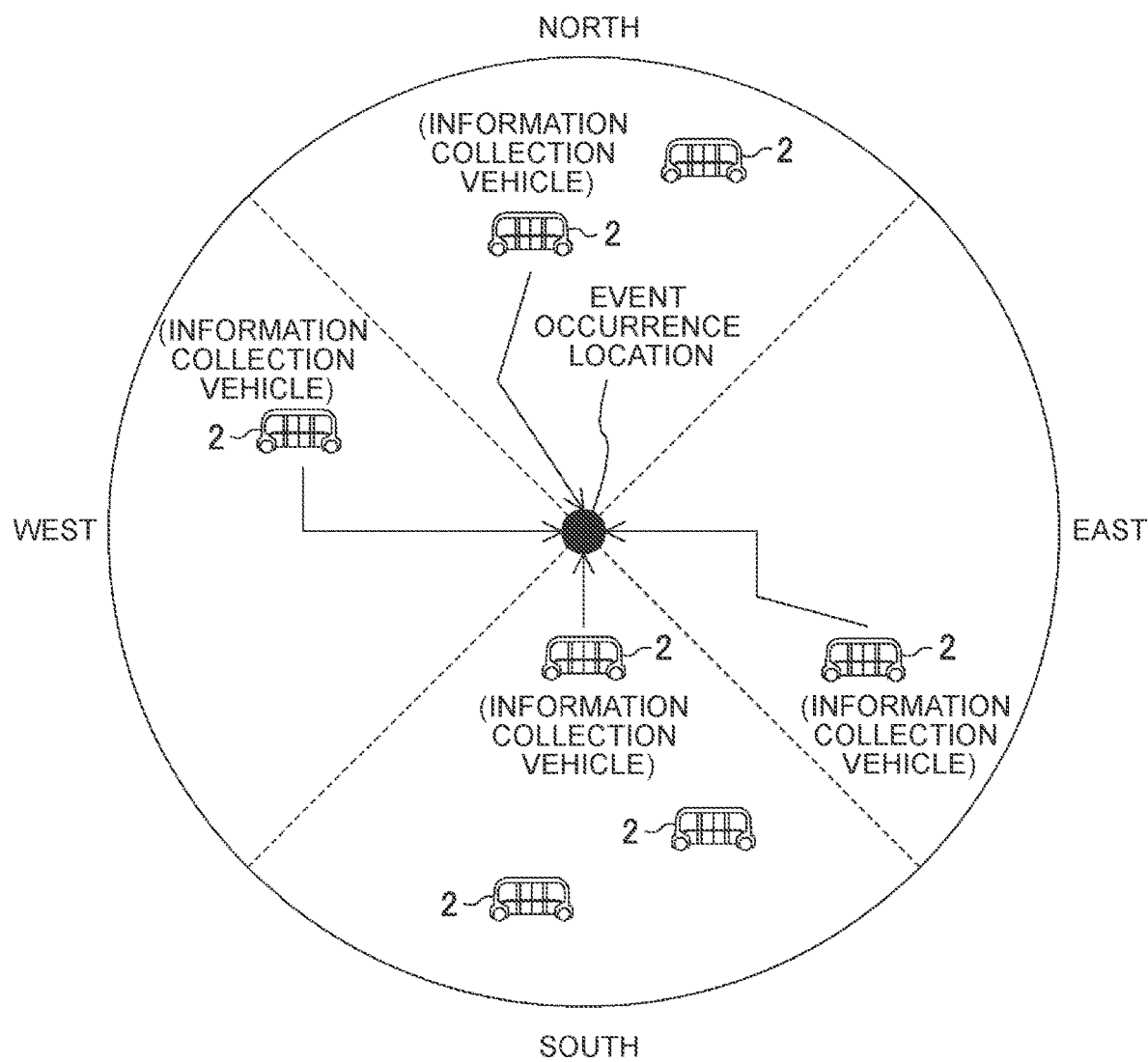
FIG. 4 is a diagram illustrating an example of a method of selecting an information collection vehicle.

In the present embodiment, the server 1 first extracts the vehicle 2 without a boarding request from a person who desires to board from the vehicles 2 that provide the mobile service. Then, as shown in FIG. 4, after dividing a circular area with a radius of several hundred meters to several kilometers from the event occurrence location as the center into four areas of north, south, east, and west areas, the server 1 selects the vehicle 2 of which distance to the event occurrence location is the shortest as the "information collection vehicle" from the vehicles 2 without the boarding request within each area.

With the above, when the vehicles 2 are directed to the event occurrence location as the information collection vehicles, the information collection vehicles are suppressed from heading to the event occurrence location in the same direction, and can be directed to the event occurrence location in a plurality of directions. Therefore, it is possible to comprehensively collect information at and around the event occurrence location.

In the present embodiment, the information collection vehicle is selected by the method above. However, simply, the vehicle 2 of which distance to the event occurrence location is the shortest may be selected as the information collection vehicle from among the vehicles 2 without the boarding request from the person who desires to board. Further, the number of divisions of the circular area is not limited to four.

In step S3, the server 1 sets a traveling route (hereinafter referred to as an "information collection route") to the event occurrence location for each information collection vehicle. The information collection route can be, for example, the shortest route to the event occurrence location. In addition to this, depending on the contents of the event, it is possible to set, as the information collection route, a traveling route that is likely to be selected as an escape route by the criminal of each incident, such as unauthorized intrusion, theft, and injury, who is the party to the event. The examples of the traveling route above include, for example, a traveling route connecting the event occurrence location and the nearest station, and a traveling route that can reach the event occurrence location while a police station or police box is detoured when there is the police station or the police box on the shortest route.

In step S4, the server 1 transmits an information collection instruction notification instructing each information collection vehicle to head to the event occurrence location. The information collection instruction notification includes the information collection route.

In step S5, the vehicle 2 that receives the information collection instruction notification moves along the information collection route toward the event occurrence location, and at that time, the vehicle 2 collects the event-related information by capturing images of the road view along the information collection route. As described above, the event-related information according to the present embodiment is information in which the captured images of the road view are associated with the information related to the location and time when the images of the road view are captured (that is, the information related to the location and time of capturing the road view).

In step S6, the vehicle 2 transmits the event-related information to the server 1. The timing of transmitting the event-related information to the server 1 is not particularly limited. For example, the event-related information may be transmitted when the data quantity of the event-related information once stored in the vehicle storage unit 202 reaches or exceeds a predetermined volume, or may be transmitted directly to the server 1 without being stored in the vehicle storage unit 202. Further, the target for transmitting the event-related information is not particularly limited, and the event-related information may be transmitted to an external client (for example, an administrative agency such as the police) in need of the event-related information.

The information collection system 100 according to the present embodiment described above includes the autonomously traveling vehicles 2 each including the information collection camera 26 (outside camera) that captures images of the outside of the vehicle 2 and the server 1 configured to be communicable with each of the vehicles 2.

Then, the server 1 is configured to, when the server 1 receives the event occurrence notification notifying that the specific event has occurred at least together with the event occurrence location, select at least one vehicle to move toward the event occurrence location from among the vehicles 2 as the information collection vehicle, and transmit the information collection instruction notification to the information collection vehicle. The vehicles 2 are configured to, when the vehicles 2 receive the information collection instruction notification, move toward the event occurrence location and collect the images captured by the information collection cameras 26 while the vehicles 2 are moving as the event-related information related to the event.

With the above, according to the present embodiment, when the specific event such as an incident occurs in the city, information on a person or a vehicle that is thought to have been at or around the event occurrence location can be collected afterward as the information related to the event. For example, when the person who is the party to the event (the criminal of the incident) leaves the scene of the incident to escape, the party leaving the scene of the incident may be captured (photographed) by the information collection vehicle heading to the scene of the incident. In addition, the information collection vehicle heading to the scene of the incident can capture the witness of the incident who is present around the scene of the incident.

As described above, according to the present embodiment, the information that contribute to identification of the person who is the party to the event, the witness of the event, etc., can be collected as a result of collecting information on the person, the vehicle, etc. that are thought to have been at or around the event occurrence location afterward. Therefore, the collected information can be used for resolution of the incident.

In the present embodiment, each of the vehicles 2 is a vehicle for a mobile service that periodically travels on a predetermined traveling route to allow a person who desires to board to board the vehicle 2. The server 1 can be configured to, when selecting the information collection vehicle, select the information collection vehicle from the vehicles 2 that no person desires to board among the vehicles 2.

With the above, the vehicle 2 that is not involved in provision of the mobile service can be effectively utilized.

Further, the server 1 can also be configured to, when selecting the information collection vehicle, select the vehicle 2 of which distance to the event occurrence location is the shortest as the information collection vehicle from the vehicles 2 that no person desires to board among the vehicles 2, for example.

This makes it easier for the information collection vehicle to capture the person or the vehicle that is likely to have been at or around the event occurrence location, and therefore it becomes easier to collect the information that contributes to identification of the person who is the party to the event or the witness of the event.

Further, the server 1 can also be configured to, when selecting the information collection vehicle, divide a predetermined area around the event occurrence location into a plurality of areas and select the information collection vehicle for each area from the vehicles 2 that no person desires to board among the vehicles present in each area.

With the above, when the vehicles 2 are directed to the event occurrence location as the information collection vehicles, the information collection vehicles are suppressed from heading to the event occurrence location in the same direction, and can be directed to the event occurrence location in a plurality of directions. Therefore, it is possible to comprehensively collect information at and around the event occurrence location.

Further, in the present embodiment, the server 1 is configured to set the information collection route (traveling route) when the information collection vehicle is caused to move toward the event occurrence location, and the information collection route is the traveling route that is presumed to be used when the party to the event leaves the event occurrence location. Examples of the information collection route above include the shortest route connecting the event occurrence location and the nearest station and a route away from the event occurrence location while a specific point such as a police station or a police box is detoured.

This makes it easier for the information collection vehicle to capture the party to the event who moves from the event occurrence location, especially for the purpose of escape.

Although the embodiment of the present disclosure has been described above, the above embodiment shows only a part of the application examples of the present disclosure, and the technical scope of the present disclosure is not limited to the specific configuration of the above embodiment. For example, in the above embodiment, the server 1 sets the information collection route. However, the information collection vehicle may set the information collection route.

What is claimed is:
1. An information collection system comprising:
   a plurality of autonomously traveling vehicles, each including a camera that captures an image of an outside of the vehicle; and
   a server configured to be communicable with each of the vehicles, wherein:
   the server is configured to, when an event occurrence notification notifying that a specific event has occurred at least together with an occurrence location of the event is received:
      divide a predetermined area around the occurrence location of the event into a plurality of areas;
      select an information collection vehicle for moving toward the occurrence location of the event for each of the areas from the vehicles that no person desires to board among the vehicles present in each of the areas; and transmit an information collection instruction notification to each of the selected information collection vehicles; and the vehicles are each configured to, when the information collection instruction notification is received, move toward the occurrence location of the event and collect the image captured by the camera as event-related information that is information related to the event.

2. The information collection system according to claim 1, wherein:

each of the vehicles is a vehicle for a mobile service that periodically travels on a predetermined traveling route to allow a person who desires to board to board the vehicle; and the server is configured to select the information collection vehicle from the vehicles that no person desires to board among the vehicles.

3. The information collection system according to claim 2, wherein the server is configured to select, as the information collection vehicle, the vehicle of which distance to the occurrence location of the event is the shortest from the vehicles that no person desires to board among the vehicles.

4. The information collection system according to claim 1, wherein:

the server is configured to set a traveling route along which the information collection vehicle is caused to move toward the occurrence location of the event; and the traveling route is a traveling route that is presumed to be used when a party to the event leaves the occurrence location of the event.

5. The information collection system according to claim 4, wherein the traveling route is the shortest route connecting the occurrence location of the event and the nearest station.

6. The information collection system according to claim 4, wherein the traveling route is a route away from the occurrence location of the event while a specific point is detoured.

7. The information collection system according to claim 6, wherein the specific point is a police station or a police box.

8. The information collection system according to claim 1, wherein the server is configured to:

determine whether a boarding request is made by a person who desires to board via an application, determine that vehicles that do not receive the boarding request out of the vehicles are vehicles that no person desires to board among the vehicles, and wherein vehicles are vehicles for a mobile service that periodically travels on a predetermined traveling route to allow the person who desires to board to board the vehicles.

9. A server comprising:

a communication unit that communicates with a plurality of autonomously traveling vehicles, each including a camera that captures an image of an outside of the vehicle; and a control unit, wherein the control unit is configured to when an event occurrence notification notifying that a specific event has occurred at least together with an occurrence location of the event is received;

divide a predetermined area around the occurrence location of the event into a plurality of areas;

select an information collection vehicle for moving toward the occurrence location of the event for each of the areas from the vehicles that no person desires to board among the vehicles present in each of the areas; and transmit an information collection instruction notification to each of the selected information collection vehicles.

* * * * *